(12) United States Patent
Löbbert

(10) Patent No.: US 11,442,013 B2
(45) Date of Patent: Sep. 13, 2022

(54) SENSOR MEMBRANE, SENSOR CAP AND/OR OPTICAL SENSOR AND METHOD FOR MANUFACTURING A SENSOR MEMBRANE

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 520 days.

(21) Appl. No.: 16/527,521

(22) Filed: Jul. 31, 2019

(65) Prior Publication Data

US 2020/0041412 A1    Feb. 6, 2020

(30) Foreign Application Priority Data

Aug. 1, 2018    (DE) .................. 10 2018 118 676.2

(51) Int. Cl.
*G01N 21/64*    (2006.01)
*G01N 21/77*    (2006.01)

(52) U.S. Cl.
CPC ........... *G01N 21/643* (2013.01); *G01N 21/77* (2013.01); *G01N 2021/6432* (2013.01)

(58) Field of Classification Search
CPC ............ G01N 21/643; G01N 21/77; G01N 2021/6432; G01N 21/645; G01N 2021/6434; G01N 2021/772; G01N 21/7703; G01N 2021/7786
USPC ........................................ 428/323
See application file for complete search history.

(56) References Cited

U.S. PATENT DOCUMENTS

| | | | |
|---|---|---|---|
| 2021/0040348 A1* | 2/2021 | Rabnawaz | C09D 183/08 |
| 2021/0246333 A1* | 8/2021 | Rabnawaz | C09D 103/02 |
| 2021/0253901 A1* | 8/2021 | Rabnawaz | C09D 183/08 |

FOREIGN PATENT DOCUMENTS

| | | |
|---|---|---|
| DE | 102012103739 A1 | 5/2013 |
| DE | 102016103750 A1 | 6/2017 |

OTHER PUBLICATIONS

Geyer, Florian, Schöcker, Clarissa, Butt, Hans-Jürgen and Vollmer, Doris, Enhancing CO2 Capture using Robust Superomniphobic Membranes, Advanced Materials (www.advmat.de), Advanced Science News (www.advancedsciencenews.com), Adv. Mater. 2017, 29, 1603524 (wileyonlinelibrary.com), 6 pp.
Geyer, Florian, Schnöcker, Clarissa, Butt, Hans-Jürgen and Vollmer, Doris, Supporting Information, Enhancing CO2 Capture using Robust Superomniphobic Membranes, Advanced Materials, Adv. Mater., DOI: 10.1002/adma.(201603524), 2013, 32 pp.

* cited by examiner

*Primary Examiner* — David P Porta
*Assistant Examiner* — Gisselle M Gutierrez
(74) *Attorney, Agent, or Firm* — Mark A. Logan; Endress+Hauser (USA) Holding Inc.

(57) ABSTRACT

A sensor membrane for an optical sensor, wherein the outer layer in contact with the medium and/or a layer adjacent thereto has a graft copolymer to form an omniphobic surface in contact with the medium, as well as a sensor cap and/or an optical sensor and a method for manufacturing the sensor membrane.

22 Claims, 3 Drawing Sheets

SENSOR MEMBRANE, SENSOR CAP AND/OR OPTICAL SENSOR AND METHOD FOR MANUFACTURING A SENSOR MEMBRANE

CROSS-REFERENCE TO RELATED APPLICATION

The present application is related to and claims the priority benefit of German Patent Application No. 10 2018 118 676.2, filed on Aug. 1, 2018, the entire contents of which are incorporated herein by reference.

TECHNICAL FIELD

The present invention relates to a sensor membrane, a sensor cap and/or an optical sensor, along with a method for manufacturing a sensor membrane.

BACKGROUND

There is a plurality of sensor membranes, also called sensor spots, for optical sensors. All sensor spots used so far are based almost exclusively on silicones or fluoropolymers. The reason for the use of these polymers is a) gas permeability, b) the ion barrier effect, and c) the good chemical resistance of these materials to aggressive media, such as strong alkalis and acids, at temperatures up to 90° C. In addition, these materials can be sterilized, which is particularly important for optical sensors in pharmaceutical applications.

A membrane based on silicone or a fluoropolymer is described by Fanselow et al., DE102014112972A1, in the form of an encapsulated sandwich structure. Other membrane structures, such as those in Trapp et. al., U.S. Pat. No. 6,653,148B2, describe optical sensors that are built up in a layer structure and have both a fluorinated polymer matrix and a fluorinated fluorescent dye.

While sensor membranes made of silicone are only moderately stable against strong hot acids and alkalis, such as nitric acid (3%, 60° C., 30 min., multiple cycles) and sodium hydroxide (5%, 90° C., 30 min., multiple cycles), but allow a rapid response time, they behave exactly the reverse with the fluoropolymers. They are stable against almost all solvents but have a relatively slow response time given changes of concentration, for example of oxygen at an oxygen sensor. Such sensor membranes are lipophobic.

SUMMARY

Based on the aforementioned prior art, it is now an object to provide a sensor membrane with a surface that has both a good response behavior and a good chemical stability.

The present invention achieves this object by providing a sensor membrane with the features of claim 1, along with a sensor cap and/or an optical sensor.

In addition, a method for manufacturing the sensor membrane is presented within the scope of the present invention.

The sensor membrane for an optical sensor is characterized by the fact that the outer layer in contact with the medium and/or a layer adjacent thereto has a graft copolymer to form an omniphobic surface in contact with the medium.

"Omniphobic" means repellent to both polar and nonpolar solvents. The term "omniphobic" is used within the scope of this invention to describe a material surface that, under standard conditions (temperature 25° C., normal pressure), has a contact angle of more than 120° with a droplet.

A material surface given which the contact angle amounts to more than 150° is understood to be "super-omniphobic". The droplet shape in both previous instances is assumed to be the so-called "sessile drop."

The contact angle hysteresis (CAH) in relation to 120° (omniphobic) and in relation to 150° (super-omniphobic) is thereby preferably in a range of less than 5°.

Ethanol, acetic acid, rapeseed oil, and water were used as sample media that assume this angle on the sensor membrane surface.

The sensor always has a so-called "top layer," which in many instances can be the outer layer in contact with the medium. In the following, the top layer is sometimes referred to as surface layer, because it forms the surface that during measuring operation of the sensor membrane is in contact with the measured medium.

It may occur that a hydrolyzable and thus easily removable protective layer is arranged on the sensor surface, typically on a top layer, for mechanical protection, and that the actual layer that comes into contact with the medium during the operation of the sensor (that is, the top layer) is arranged below it. The layer adjacent to the protective layer therefore may also have omniphobic properties.

Advantageous embodiments of the invention are the subject matter of the dependent claims.

It is advantageous if the outer layer in contact with the medium, and/or a layer adjacent thereto, has particulate microstructure-forming particles, preferably as spherical or capsule-shaped components of the layer, particularly preferably as natural substance capsules, wherein a nanostructure is grafted onto the microstructure-forming particles.

The surface may particularly preferably have a pincushion structure and/or a honeycomb structure.

The microstructure-forming particles can be immobilized in the outer layer or the layer adjacent thereto and thus form a microstructure. The aforementioned grafted nanostructure can be advantageously formed as a grafted side chain, wherein the nanostructure is covalently bonded with a reactive matrix material of the respective layer, said reactive matrix material being located on the microstructure. Alternatively, the grafted side chains can be bound directly to the microstructure-forming particles, preferably with an exine, and wherein the microstructure is selected from a group comprising silicon oxide particles; titanium oxide particles; modified and/or unmodified polystyrenes; styrene polymers; polybutadiene; natural substance capsules, in particular shells or scaffold structures of diatoms, exines, e.g. exines of spores and/or exines of pollen, in particular of *Lycopodium clavatum*; and/or hybrids of the aforementioned compounds. The microstructure-forming particles can be made by: grafting microstructure-forming particles comprising polybutadiene or polybutadiene-coated microstructure-forming particles with ethoxysilane side chains, grafting microstructure-forming particles comprising polybutadiene or polybutadiene-coated microstructure-forming particles with methoxysilane side chains or by modifying an exine, preferably without a buffer group, in particular with hydroxyl groups and/or double bonds. To the hydroxyl groups and/or the double bonds, side chains can be covalently bound by grafting.

The nanostructure is thereby defined by the grafted monomers that form the side chains. The grafting of the nanostructure takes place on the microstructure in solution or in a low-viscosity medium, preferably by means of condensation or controlled radical reaction, for example by adding chain enders after a reaction time $t_x$.

The components which are grafted onto the sensor membrane surface may advantageously in the present instance be the following components: at least one hydrolytically cross-linkable group as a chain extender and/or as chain end groups and/or at least one radical cross-linkable group as a chain extender and/or as chain end groups.

Examples for hydrolytically cross-linkable groups usable as chain extenders are: mono- or bifunctional groups such as dimethyldimethoxysilane, dimethyldiethoxysilane, trimethylmethoxysilane, hexamethyldisoxane, octamethylcyclotetrasiloxane, polydimethylsiloxane, polydimethylsiloxane, polydimethylsiloxane T22, polydimethylsiloxane T35, and/or polydimethylsiloxane T46. Examples for hydrolytically cross-linkable groups usable as chain end groups are: trimethylmethoxysiloxane and/or triethylethoxysiloxane. Examples for radical cross-linkable groups usable as chain extenders are: monofunctional monomers, such as perfluorinated groups, perfluoroalkyl groups, alkyl with alkynyl and/or vinyl groups and/or derivatives such as one or more styrene, acrylate, acrylamide, methacrylate, methacrylamide, vinyl ester, and/or vinyl amide groups. Examples for radical cross-linkable groups usable as chain end groups are tempo-2,2,6,6-tetramethyl-piperidinyl-1-oxy (TEMPO), 2,2,5-trimethyl-4-phenyl-3-azahexane-3-oxyl (TIPNO), N-tert-butyl-N-[1-diethylphosphono-(2,2-dimethylpropyl)] nitroxide (SG1), HALS compound, thiols, and/or amines.

The microstructure-forming particles can be advantageously selected from the following group: silicon oxide particles; titanium oxide particles; modified and/or unmodified polystyrenes or styrene polymer or polybutadienes; natural substance capsules, in particular shells or scaffold structures of diatoms, exines of spores and/or exines of pollen, in particular of *Lycopodium clavatum*. A multitude of these microstructures are thereby FDA-compliant and can additionally include or superficially adsorb functional substances such as, for example, pigments or an optically active dye. According to the invention, hybrids of inorganic and organic material are also conceivable. Examples would be organic microspheres coated with nano $SiO2$.

The sensor membrane may have a topographically structured surface, preferably a nubby surface, in order to reduce the adhesion tendency of droplets, wherein the structuring is formed by the microstructure-forming particles, a number of which are partially embedded in a matrix material of a further layer of the sensor membrane, said further layer being positioned under the top layer or the layer adjacent thereto, and partly protrude from the matrix material in the form of nubs and are thereby part of the surface layer contacting the medium, i.e. the top layer of the sensor membrane.

The sensor membrane may preferably have a multilayer structure with at least the following functional layers: an adhesion promoting layer for bonding to a substrate and a layer sensitive to the analyte, in particular comprising a luminophore, at least one reflective layer, diffusion layer, and/or an optically insulating layer, and a surface layer comprising a surface polymer.

The surface layer, i.e. the top layer of the sensor membrane, thereby has grafted side chains in certain areas, or particularly preferably over the entire surface. It can comprise a microstructure formed by the microstructure-forming particles described before. On the microstructure, the nanostructure formed by the grafted side chains is positioned. In addition, a hydrolyzable protective layer can optionally be arranged on the surface layer or top layer.

The optional protective layer can be hydrolyzable, wherein in this instance the underlying layer, which is increasingly exposed during measurement operation by dissolution of the protective layer in the measured medium, is also formed as an omniphobic layer at least on the media side.

The average distance of a side chain from a directly adjacent side chain advantageously amounts to at least 2 A (angstroms), preferably between 3 and 20 A. A preferred permeability to an analyte is thereby ensured.

The grafted side chains may preferably have an average length of at least 10 A (angstroms), preferably between 12 and 70 A. This length of the side chains or molecule side chains is particularly favorable for the formation of the omniphobic surface.

In addition to the sensor membrane, other segments of a sensor cap or an optical sensor may also have the corresponding graft copolymer.

A corresponding sensor cap of an optical sensor according to the invention, and/or an optical sensor according to the invention comprising a sensor membrane according to the invention, may therefore preferably also have a layer with a graft copolymer beyond the sensor membrane.

For this purpose, a first polymer layer with microstructure-forming particles can initially be applied, and then the grafting of the side chains can be performed.

As an alternative to the microstructure-forming particles, a surface treatment, for example by plasma injection, can take place both at the surface of the sensor membrane and, if applicable, at the surfaces beyond the sensor membrane, and the side chains can then be grafted directly onto the matrix polymer.

A method according to the invention for manufacturing a sensor membrane in accordance with the invention according to one of the preceding claims, in particular a sensor membrane with microstructuring and nanostructuring, comprises at least the following steps: providing an arrangement of a plurality of functional layers of a sensor membrane, wherein an outer layer has a surface with microstructure-forming particles at least partly embedded in a matrix material of the outer layer; and grafting a compound onto the microstructure-forming particles and/or onto a reactive matrix material covering the microstructure-forming particles by graft polymerization or graft copolymerization, thus forming a nanostructure by forming side chains. The grafting step can be performed in a solution or in a state of low viscosity, i.e. at a viscosity of less than 20.000 mPas (under standard conditions for temperature and pressure).

A nanostructuring can thereby advantageously take place within the scope of the method by grafting side chains onto the matrix material, in particular onto a pretreated matrix material, and/or onto the microstructure-forming particles of a sensor membrane that are embedded therein, using activatable, in particular temperature-activatable, radicals and/or ions and/or thermal initiators and/or photoinitiators and/or radical-forming means. The reactive matrix material can be present as a coating of the microstructure-forming particles already while the particles are embedded into the matrix of the outer layer. Alternatively, the reactive matrix material can be applied as a coating to the microstructure-forming particles embedded in the matrix material of the outer layer.

The surface structure of the sensor membrane, in particular after grafting, can be modified photochemically by applying a mask at a wavelength of between 200 and 1000 nm.

BRIEF DESCRIPTION OF THE DRAWINGS

In the following, the invention is described in detail by means of an exemplary embodiment using the attached drawings. The drawings thereby also contain several features that, taken in isolation, can be combined in an obvious way with other exemplary embodiments that are not shown. The exemplary embodiments in their entirety are thereby in no way to be understood as limiting the scope of protection of the present invention. Shown are.

DETAILED DESCRIPTION

"Natural substance" is understood as preferably any possible natural substance (linear, capsule). Natural substances are preferred that can be used to encapsulate other substances. These substances are meant according to the invention, but not exclusively so. Temperature-stable and hydrolytically stable biopolymers are meant in particular.

Hydrolytically stable/gamma-stable/mechanically stable preferably means a stability that exceeds the standard membrane of commercial products. Hydrolytically stable, in particular in connection with silicone-based membranes, means that the membrane does not show any optical degradation under the microscope even after 50 cycles in 90° C. hot sodium hydroxide.

Temperature stability preferably means a temperature stability that exceeds the temperature stability of standard membranes of commercial products, i.e. temperatures of 140° C. or more.

According to the invention, a surface layer means the last functional layer of the sensor membrane in contact with the medium, which is applied and covalently bonded to the additional layers of the sensor membrane. The surface layer is cross-linked by hydrolytically stable covalent bonds and is also covalently bonded with an underlying adjacent layer, and has a super-omniphobic surface which is produced by a nanostructure grafted onto a microstructure.

A matrix material may preferably be a polymeric base material of a layer, a sandwich structure, and/or a layered structure that is applied onto a transparent or translucent substrate and is contained in the adhesion promoter and/or in at least one layer sensitive to the analyte and/or in at least one reflective layer/diffusion layer/optically insulating layer and/or in a hygienic layer.

As a base material, at least 50% by weight, preferably at least 65% by weight, in particular 75% by weight of the matrix material may be contained in one of the aforementioned layers. With the surface polymers, the matrix polymer can enter into a covalent bond with the surface polymer in natural form, or by activation such as via plasma treatment, ozonization, and/or UV light exposure.

Figure 1:
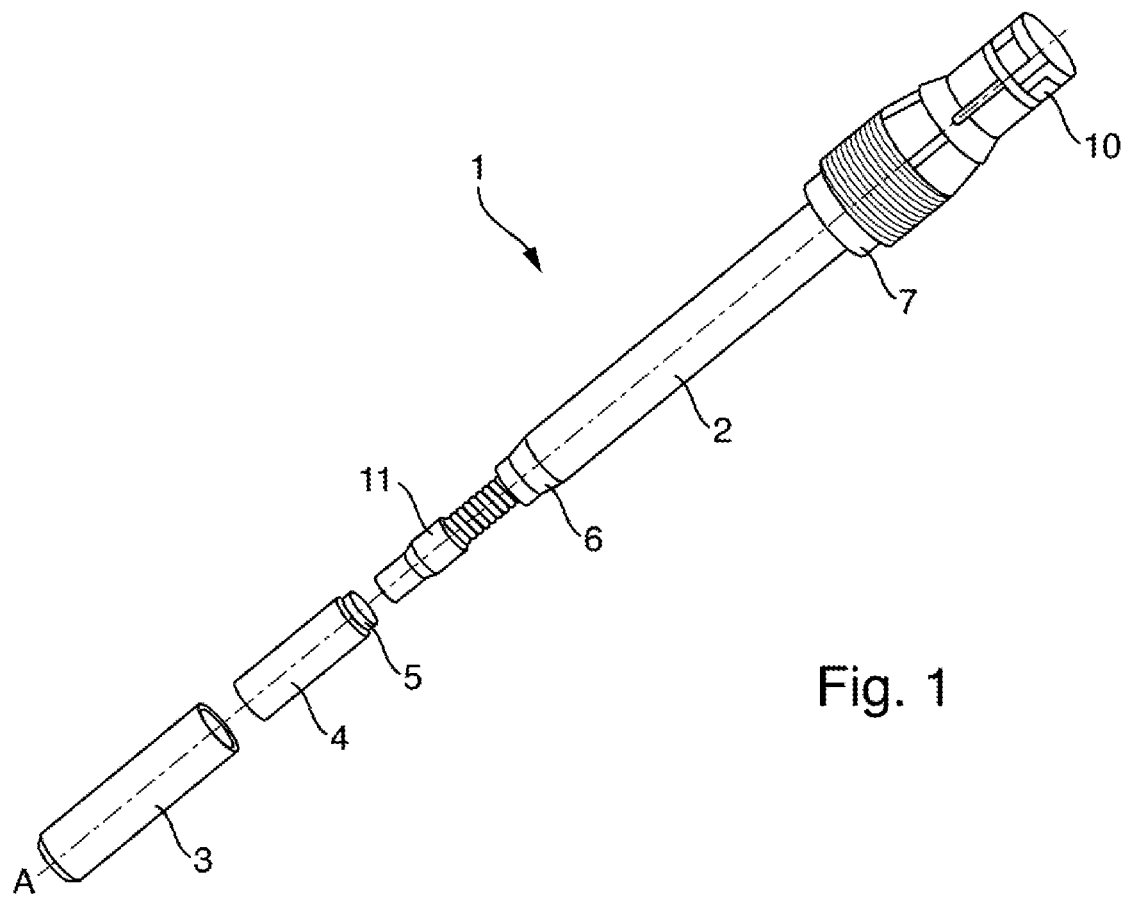
FIG. 1 shows a schematic exploded view of an exemplary embodiment of an optical sensor according to the invention.

FIG. 1 shows an optical sensor 1. The sensor 1 has a coupling point 10 for coupling to an evaluation unit. Endress+Hauser has distributed a corresponding coupling point 10 under the name "Memosens" for many years.

The optical sensor 1 has a receiving and transmitting unit 7. This receiving and transmitting unit 7 has a light source, for example an LED, for emitting an optical signal, and a receiving unit, for example a photodiode, for receiving the optical signal and converting it into a current-equivalent and/or voltage-equivalent measured value.

The optical sensor 1 has a sleeve-shaped housing segment 2 which is connected to the receiving and transmitting unit 7. An optical conductor 11 or optical wave guide is routed within the housing segment 2.

The sleeve-shaped housing segment 2 is connected to an optical waveguide mount 4 and a thread 5, which is connected to a thread 6 at the end of the housing section 2.

Figure 2:
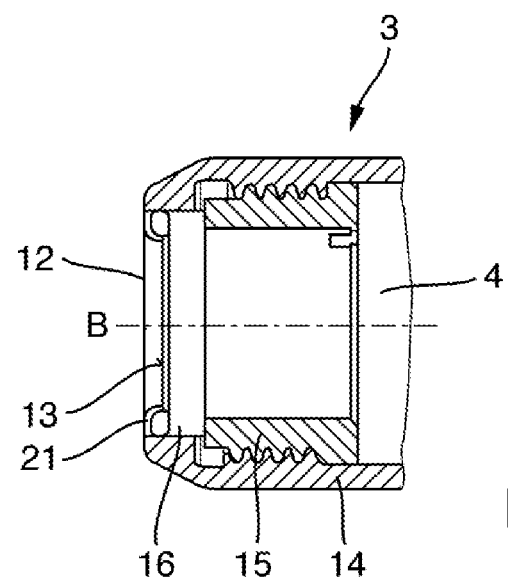
FIG. 2 shows partial section of a sectional view of a sensor cap of the optical sensor of FIG. 1.
Figure 3:
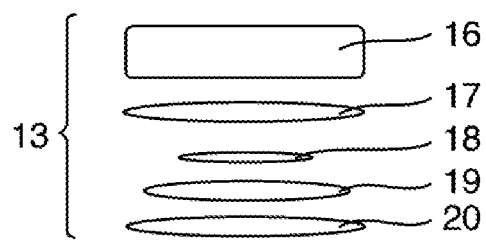
FIG. 3 shows schematic representation of the structure of the sensor membrane of the sensor cap of FIG. 2.

A sensor cap 3 is attached to the optical waveguide mount 4. According to FIG. 2, the sensor cap 3 has a sensor membrane 13 in contact with the medium. The sensor cap 3 has a housing shell 14 and a longitudinal axis B which lies on the longitudinal axis A of the sensor 1. The sensor cap 3 has an annular insert 15 with which the sensor membrane 13 is pressed from the interior of a housing shell against a projection at the edge and/or a seal 21 at the edge.

In this manner, the sensor membrane 13 forms the front side 12 of the sensor cap 3 and is provided for contact with the medium to be measured.

Accordingly, the sensor membrane 13 is arranged on a front side 12 of the sensor cap 13 in contact with the medium, wherein "in contact with the medium" within the scope of this invention means that, when the optical sensor 1 is used as intended for this purpose, the front side is in contact with the medium to be measured. The sensor membrane 13 thereby contains luminophore molecules that are embedded in a matrix material 101.

The measuring principle of the optical sensor 1 is based on the principle of fluorescence quenching and is described in more detail below on the basis of the determination of a concentration of dissolved oxygen in the measuring medium.

The concentration of oxygen molecules of the sensor membrane 13, thus also the partial pressure of oxygen, thereby corresponds to the concentration or partial pressure in the measuring medium.

In the measurement process, a first light signal with at least one corresponding first wavelength is initially emitted to excite the luminophore molecules via the light source.

If the light signal hits the luminophore molecules, these are excited and emit a second light signal.

If oxygen molecules are present in the sensor membrane 13, they attach themselves to the luminophore molecules and influence the emission light signal (for example, different intensity, different phase angle, or different decay time). For example, an energy transfer takes place via the collision of the oxygen molecule with the luminescent substance (high-energy triplet oxygen is produced). The intensity and decay time of the emission light signal are thereby reduced. This effect is also referred to as "quenching", and the oxygen molecules are thereby what are known as "quenchers."

The intensity of the emission light signal depends on the concentration of quencher molecules. Of course, not only oxygen molecules but also other molecules can be determined in this manner, depending on which luminophore is used.

The sensor membrane 13 has a multilayer structure. The outer layer 20 in contact with the medium has at least one microstructured and nanostructured structured omniphobic surface, which is produced by grafting onto a polymer material of the sensor membrane.

Within the scope of this invention, "grafting" is understood as graft copolymerization.

Preferably, via the grafting a so-called "pin cushion" or "honeycomb" structure can be produced on the polymer material of an outer layer 20 in contact with the medium. The surface is hereby modified in such a manner that it is then omniphobic or even super-omniphobic, i.e. repellent to all solvents. A self-cleaning surface with regard to all solvents (polar or non-polar) is thereby achieved.

Figure 5:
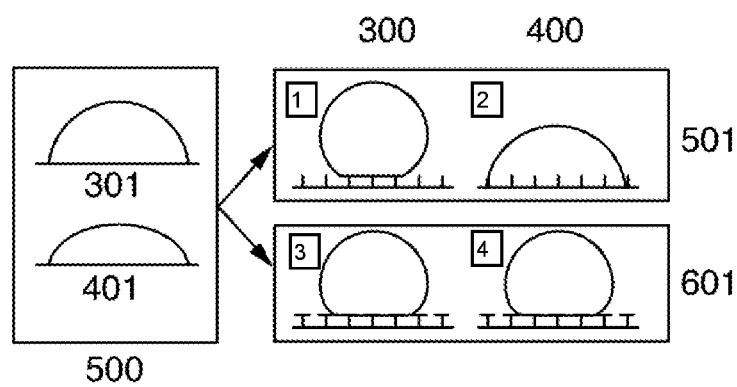
FIG. 5 shows a schematic sketch to show a water droplet and an oil droplet on an omniphobic surface.

An omniphobic surface 601 is sketched in FIG. 5, and a hydrophobic surface 501 is also additionally shown for comparison. On the left, one can see a smooth surface 500 and the propagation of an oil droplet 401 and a water droplet 301 along this surface 500. In the upper illustration (1) and (2) of hydrophobic surface 501, the behavior of the oil droplet 300 and the water droplet 400 is shown on a surface with microstructure formers.

An omniphobic surface 601 is shown in the lower illustration (3) and (4) likewise for the oil droplet 300 and the water droplet 400, wherein the microstructure-forming particles have grafted side chains and are schematically represented in a T-shape.

The self-cleaning surface may have compounds with microstructures and nanostructures that can be provided by incorporating microstructure materials such as exines/inorganic coated metal oxides (for example, polybutadiene with siloxane groups) or polystyrene derivatives into the polymer surface. The incorporation can take place via mixture with a polymer matrix material and application to the surface in contact with the medium. The application can be in certain areas or across the entire surface.

The components are modified in such a manner that they can enter into a chemical bond with the matrix, and enter into a chemical bond with monomers, which enable a nanostructuring of the surface via grafting.

Essentially, there are two preferred types of graft polymerization within the scope of this invention. The first preferred type of graft polymerization includes (a) grafting siloxanes or performing radical graft polymerization of monomers to an organic surface of microstructure-forming particles (this type of organic surface is provided, for example, by exines or polybutadiene particles), wherein the organic surfaces comprises reactive double bonds or polar functional groups (e.g. hydroxyl- or amine-groups). The second preferred type of graft polymerization includes (b) grafting siloxanes or other hydrolysable side chains to an inorganic surface (such as a surface of e.g. particles comprising $SiO_2$, shells of diatoms, or microparticles having hydroxyl-groups or being modified with hydroxyl-groups). Here, the grafting of siloxanes is recommended.

Of course, hybrids of these materials are also conceivable.

The modified medium-contacting outer layer 20 formed in this manner is preferably hydrolytically stable and has permanent omniphobic, in particular super-omniphobic, properties.

The modified outer layer in contact with the medium is additionally preferably temperature-stable up to 140° C., and stable with regard to gamma radiation.

Preferred grafted polymer side chains are preferably vinyl and/or silicone side chains.

Within the meaning of the invention, all manufacturing processes known to the person skilled in the art for the application of individual sensor membrane layers, such as spray coating, doctoring, laminating, spin-coating, dip-coating, and screen printing, are applicable in principle. However, preference is given to methods in which graft copolymerization can best be controlled. (low viscosity, for example by means of solvent, structure (order in the matrix, for example free segment mobility) or temperature). Spray coats and dip coats have proven to be particularly suitable here.

In this manner, the outer layer 20 in contact with the medium can also be realized by applying the grafted compound, which can be embedded in a polymer matrix material.

The surface of the sensor spots is then coated with a material for the specification of a defined micrometer structuring of the surface, and later is modified, in particular coated, with a nanostructuring by grafting side chains onto the boundary surface.

In principle, all gas-permeable polymers having an oxygen gas permeability greater than 10-14 cm3 cm/cm2*s*Pa can be considered for the matrix material. Less permeable polymers come into question only given the incorporation of scaffold bodies, which in turn are very permeable.

In principle, less acid-stable and/or base-stable polymers such as silicones can also be used if the surface layer is hydrolytically stable. Suitable materials are silicone-based polymers; fluoropolymer-based polymers, in particular partially fluorinated polymers such as polychlorotrifluoroethylene (ECTFE), polyvinyl fluorides, polyvinylidene fluorides (PVDF), ethylene-tetrafluoroethylene (ETFE); polyurethane-based polymers; or hybrid polymers with siloxanes.

The aforementioned polymers may preferably include other components, in particular polymers with a star-shaped structure; organometallic and ceramic compounds with a honeycomb structure; hybrid polymer-metal compounds; polymer-ceramic compounds; polymer-glass compounds; small organic molecules, in particular with a chain length n<12; organometallic nanoparticles; hybrid polymer compounds, natural substance capsules optionally embedded in a polymer compound; and/or silver acetates applied to a ceramic.

What are known as microstructure-forming particles are advantageously embedded in the matrix material. As microstructure generators within the meaning of the present invention, a distinction is to be made between inorganic and organic microstructure generators. By embedding these microstructure generators in the aforementioned matrix material, a microstructure is formed within a layer of a sensor membrane.

Particulate particles of titanium oxide, silicon oxide, and/or barium sulphate are particularly preferably suitable as inorganic microstructure generators within the scope of the present invention. The particle size of the aforementioned particles is preferably in the range of 0.1-10 µm. The embedding of a portion of the aforementioned particles takes place, preferably only partially, for example on one side, in the matrix material, such that, in the instance that the surface touching the medium, a dot or nub structure is formed, wherein the particle surface is only partially covered by the matrix material or embedded by the matrix material and can partially be in direct contact with the medium.

As an alternative to inorganic microstructure generators, organic materials can also be used as microstructure generators. These should preferably have the highest possible temperature stability up to 140° C., hydrolysis stability with regard to hot alkalis (5%, 90° C., 30 min, at least 30 cycles), gamma stability (25 kGy), low swelling behavior, and abrasion stability.

A particularly preferred class for both inorganic and organic microstructure generators is the class of natural substance capsules, hereinafter also referred to as "exines" or "beads."

In the following, the manufacturing of these natural substance capsules is first described using a concrete example.

In order to produce natural substance capsules or exines as a base material for a microstructured surface, the decomposable components such as proteins, lipids, nucleic acids, and carbohydrates are removed via hydrolysis of the spores, such as *Lycopodium clavatum*. For this purpose, *Lycopodium clavatum* spores (250 g) are suspended in acetone and cooked under reflux for 4 hours. The dispersion is centrifuged and the supernatant is decanted. The degreased spores are stirred in 4% potassium hydroxide solution (vol. %) with reflux overnight, then filtered, washed neutrally with hot water, and then washed with ethanol until colorless. The bases of hydrolyzed sporopollenins are then dried overnight in a desiccator of phosphorus pentoxide. 150 g of the product thus obtained are suspended in orthophosphate (85%, 600 ml) and stirred under reflux for one week. The degreased and base-hydrolyzed and acid-hydrolyzed sporopollenins are filtered and washed neutrally with water and washed again with hydrochloric acid (200 ml), acetone (200 ml), and ethanol; after refluxing for 1 h, it is filtered and dried in a desiccator with phosphorus pentoxide. A new basic hydrolysis with potassium hydroxide and a washing with hot water and drying of the exine takes place.

Figure 4:
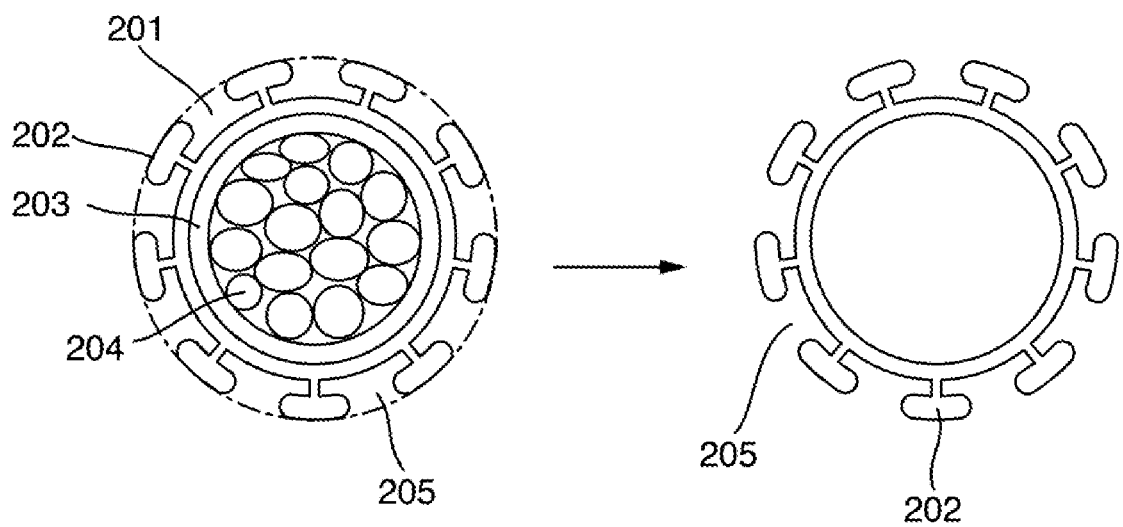
FIG. 4 shows a schematic sketch of the mode of action of a natural substance capsule in the sensor membrane.

FIG. 4 shows a natural substance capsule 202 with a so-called "pollen cement" 201, the so-called "intine" 203, and the genetic material 204, also called the pollen grain, of one pollen. In addition, nano-gaps 205 can be seen along the surface of the natural substance capsule 202.

Another variant according to the invention would be diatoms: Diatoms have a different characteristic structure depending on where they are grown, but they usually have a silicon dioxide shell and organic components contained therein. All organic components of the sample can be dissolved via treatment with sulfuric acid, hydrogen peroxide, potassium dichromate, and/or another oxidizing agent. Only the pure silicon dioxide shells remain.

Natural capsule materials can have a preferred size between 1 and 100 μm, even more preferably 1 to 50, and most preferably 1 to 25 μm. Examples of encapsulation materials are shown by way of example in the table below. Preferably, one or both of the following capsule types can be used for the sensor membrane 13:

Natural substance capsules of type a) with an average capsule size of 1-100 μm can be used for the microencapsulation of a luminescent dye and/or an indicator dye, for the stabilization of the sensor membrane against gamma rays, and/or for protection against build-up or embedded substances prior to hydrolysis. A particularly preferred particle size of natural substance capsules of type a) is in the range between 1 and 25 μm.

Natural substance capsules of type b) with an average capsule size >100 μm can be used for the microencapsulation and macroencapsulation of enzymes, preferably to protect them from high-temperature exposure (for example, glucose oxidase for glucose measurement, lactase, alcoholase etc.).

Natural substance capsules both from organic materials and from inorganic materials are conceivable. A plurality of the capsule materials consists of organic materials. Inorganic materials, which can be obtained from diatoms, are also well-suited for use in a sensor membrane due in particular to their small particle size (a few nm to mm in length) and chemical stability.

Possible starting materials for the manufacturing of natural substance capsules are the following species.

| | |
|---|---:|
| *Bacillus subtilis* | 1 μm |
| *Myosotis* | 2-5 μm |
| *Asperigillus niger* | 4 μm |
| *Penicillium* | 3-5 μm |
| *Cantharellus minor* | 4-6 μm |
| *Ganoerma* | 5-7 μm |
| *Ambrosia Trifida* | 10 μm |
| *Urtica dioica* | 10-12 μm |
| *Agrocybe* | 10-14 μm |
| *Periconia* | 16-18 μm |
| *Epicoccum* | 20 μm |
| *Lolium perenne* (Rye grass) | 21 μm |
| Timothy grass | 22 μm |
| Hemp | 25 μm |
| *Lycopodium clavatum* | 26 μm |
| Pine pollen | 30 μm |
| *Achnanthes* (diatom) | 40 μm |
| *Secale cereale* (cereal rye) | 42 μm |
| *Lycopodium* powder | 40 μm |
| Maize | 80 μm |
| Pumpkin | >100 μm |

The natural substance capsules can preferably be constructed as aliphatic and/or aromatic compounds, in particular polymer compounds. They may advantageously contain carbonyl and/or carboxylic acid groups, and/or phenolic and/or ether groups, and have a marked temperature stability up to preferably at least 200° C.

The preferred wall thickness of the natural substance capsules can be, without an outer contour (see FIG. 4), between 1-10 μm, preferably between 2-7 μm, particularly preferably between 2.5 and 4.5 μm.

The natural substance capsules are formed to be hollow after the chemical treatment by removing the intine from the inside. This allows larger amounts of material to be received inside the cavity of the natural substance capsule.

Standard synthetic-based microspheres such as polystyrene-divinylbenzene (PS-DVB) can also be used within the scope of this invention, but have a cross-linked structure and are therefore less preferred. These polystyrene microspheres are a wildly entangled and cross-linked polymer. Inside the microsphere, it is just as branched as it is on the outside. By contrast, the exines (natural substance capsules) are hollow inside after hydrolysis, since all hydrolysis-sensitive components are solubilized and washed out. Dye uptake can take place on the surface in nano-gaps of the natural substance capsules. Small components such as dyes, for example also a luminophore, are more firmly bound in the nano-gaps.

Natural substance capsules are particularly suitable as an encapsulation material in a matrix material of a sensor membrane. It has been found that the natural substance capsules bring with them a natural pH buffering that protects a sensor membrane against mechanical and hydrolytic decomposition.

In addition, the use of natural substance capsules results in only slight swelling in organic solvents such as alcohols, or ethers such as tetrahydrofuran, dioxanes or also alkanes, and/or chlorinated solvents, which enables the use of such sensor membranes in a wide variety of industrial applications.

The high temperature stability and high stability with regard to gamma rays, along with harmlessness of the material, are particularly advantageous given most natural substance capsules. They are not cytotoxic and are usually FDA-approved, and mostly also meet the GRAS ("generally recognized as safe") standard.

Pollen such as *Lycopodium clavatum*, which is stable with regard to enzymatic degradation, can be used as starting materials for natural substance capsules. These can be used, for example, in sensor membranes of optical sensors for the determination of lactose and/or glycose concentration.

Glucose oxidase encapsulated in liposomes as natural substance capsules can even advantageously have a diameter of less than 250 nm, for example 200 nm. The encapsulated substance may be present in aqueous emulsions as a cluster.

*Lycopodium clavatum* in particular is chemically highly stable for the aforementioned application, but *Ambrosia trifida* exine (for example) can also be considered.

The natural substance capsules make a contribution to sustainability, since all-natural substance capsules are preferably of vegetable origin and can be re-grown or re-bred. Since small proportions of polar groups may also be present in the natural substance capsules, the capsules can be incorporated into the matrix material not only physically, but also chemically by means of covalent bonds.

In the following, a few variants of the manufacturing of the aforementioned natural substance capsules are described in more detail:

The starting materials are composed of stable cell wall materials as well as unstable materials such as approximately 10-15% cellulose, approximately 10% hemicellulose, 10-15% lignin, and 65% lipids and proteins. Of particular interest are the stable cell walls/cell structures of the plant starting materials.

Since the preferably plant or fungicidal cell walls/capsule materials contain genetic material, along with proteins, lignin, cellulose, these must initially be removed. This can take place by hydrolyzing and washing out the degraded, less stable biopolymers. The pollen cement, the intine (proteins) and the genetic material should be removed as completely as possible to avoid the presence of unstable materials. The extremely stable cell walls or natural capsule materials remain behind after the treatment procedure and can be processed directly or after brightening for processing as filler material or encapsulation material for the sensor membrane 13. A corresponding principle for the manufacturing or provision of the natural substance capsules is shown in FIG. 4.

A natural substance is defined as a substance produced in a natural manner. Within the scope of the present invention, the natural substances are made in the form of capsules in order to receive substances via a specific surface structure in the position [sic]. The capsules thereby have a surface structure and/or a cavity in which a storage of dyes, enzymes, or similar substances can take place. As the natural substance capsule within the scope of the present invention, an annular structure can also be formed; within the scope of the present invention, the capsule does not necessarily need to be a completely closed capsule; rather, the capsule can also have openings, for example.

Natural substance capsules which are obtained from spores of a moss, fern, grass, fruit, fungus, but also cell structures of bacteria, are particularly suitable for the use according to the invention. The natural substance capsules do not necessarily need to contain a cavity, since natural substance capsules can also adsorb and protect luminophores via nano-gaps in the scaffold structure. However, the use of natural substance capsules with cavities has proven to be advantageous.

According to the invention, the natural substances are polymers that can also embed fillers. In addition to the main cavity of a natural substance capsule, a natural substance capsule may also have additional nano-cavities along the outer surface, in particular along the cell wall.

Cleaning Agents:

Surprisingly, it was additionally shown that a lower change in the measured value of the partial pressures could be achieved after 1 day of treatment in a 70° C. hot 3% sodium hypochlorite solution, in particular at low partial pressures.

Swelling Behavior with Regard to Solvents:

With some technical applications, water-soluble solvents such as alcohols, THF, dioxanes and insoluble solvents such as fats may also be used. Some of them cause either membrane, filler or both to swell. Therefore, the swelling behavior in various solvents was performed with natural substance capsules. The capsules K2 showed a low degree of swelling in THF, acetone, and DMSO (approximately 10-30%), but the polystyrene capsules swell noticeably and showed a weight increase of 300-500%.

Gamma Irradiation:

A better measured value stability of the sensor spot after gamma irradiation, after irradiation at 20 kGy and 50 kGy, could be established in comparison with conventional sensor spots.

The natural substance capsules can be provided by two preferred types in a sensor membrane. a) By embedding the natural substance capsules in a matrix material or b) by coating the natural substance capsules and subsequently embedding them in a matrix material, as well as a combination of both variants.

The natural substance capsules can advantageously be filled with hydrolysis-stable and temperature-stable natural substances (cholesterol/beeswax). According to the invention, however, other harmless fillers can also be used. (e.g.: fatty acids, polymers etc.)

However, the natural substance capsules manufactured according to the invention can also be incorporated very well into a polymer matrix. For this purpose, for example, 0.5 g of a *Lycopodium cavatum* hollow body as it was produced under K4a was dispersed in 4 g of silicone, 0.05 g of ruthenium tris(4,7-diphenyl-1,10-phenanathroline) trichloride, and 10 g of cyclohexane, and techniques known to the person skilled in the art, such as spin coats/spray coats or doctoring, were applied to a substrate or a coated substrate. The single-layer or multilayer sensor membrane component that is produced can later be embrittled and reduced to smaller pieces in liquid nitrogen. These can later be applied to a substrate layer, for example by means of doctoring.

FIG. 3 shows a schematic drawing of a sensor membrane 13 for an optical sensor. The sensor membrane 13 is arranged on a substrate layer 16 and comprises a luminophore-containing layer 17, a light protection layer 18, an adhesive layer 19, and a top layer 20, which at the same time forms the front side 12. The top layer 20 is thereby the layer in contact with the medium during continuous operation.

This layer is also referred to as the top layer within the scope of this invention. It may additionally be provided with a protective layer, which is not shown. The protective layer comprises a hydrolytically degradable layer, for example a silicone layer. During measuring operation of the membrane in a liquid medium, the degradable layer dissolves at least partially, so that the top layer 20 becomes the outer, medium contacting layer of the sensor membrane 13.

Optionally, an adhesion promoter layer can be arranged between the substrate layer 16 and the luminophore-containing layer 17.

Furthermore, an intermediate layer can optionally be arranged between the luminophore-containing layer 17 and the light protection layer, which prevents the migration of components of the light protection layer into the luminophore-containing layer.

Typically, it comprises a sensor membrane 13 as it is already commercially available, with the difference that one or more of the aforementioned layers 16 to 20 has natural substance capsules 202. The natural substance capsules 202 can thereby be stored in a material of layers 16 to 20, the matrix material.

Figure 6:
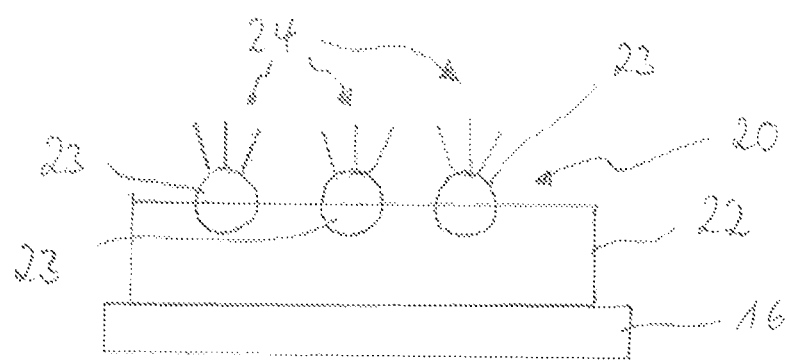
FIG. 6 shows a schematic sketch of a sectional view of a sensor membrane comprising a microstructure and a nanostructure formed thereon according to a first example.

FIG. 6 shows a schematic drawing of a sectional view of a sensor membrane 13 arranged on a substrate layer 16 according to a first example. The sensor membrane 13 comprises a top layer 20 with an omniphobic surface. The surface of the sensor membrane 13 is topographically structured by means microstructure-forming particles 23 partially embedded in a layer 22, which is arranged below the top layer 20. These microstructure-forming particles 23 form part of the top layer 20. As mentioned before, the microstructure-forming particles 23 can comprise exines, surface-modified exines, microbeads made of inorganic substances or surface-modified microbeads, e.g. consisting of polystyrol or SiO2. Side chains 24 are grafted directly to the microstructure-forming particles 23, thus forming a nano structure on top of the microstructure of the top layer 20. The combination of the microstructure and the nanostructure at the surface of the sensor membrane 13, which during measuring operation is in contact with the measured medium, provides for the omniphobic quality of the surface.

Figure 7:
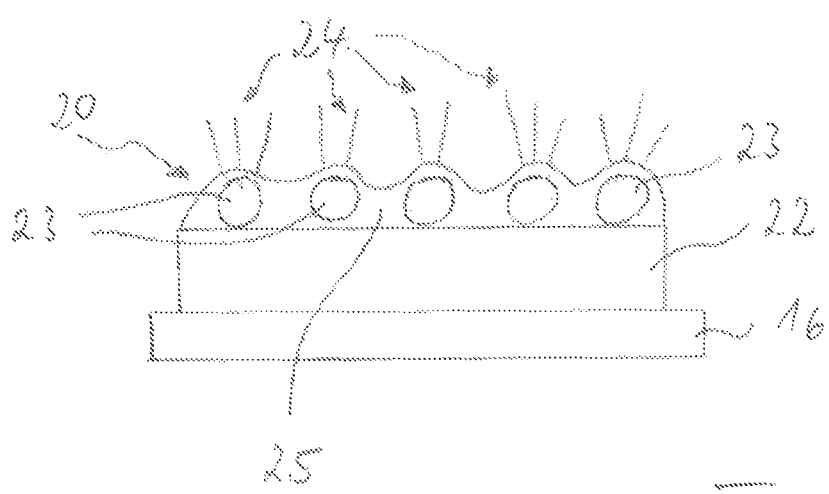
FIG. 7 shows a schematic sketch of a sectional view of a sensor membrane comprising a microstructure and a nanostructure formed therein according to a second example.

FIG. 7 shows a schematic drawing of a sectional view of a sensor membrane 13 arranged on a substrate layer 16 according to a second example. The sensor membrane 13 comprises a top layer 20 with an omniphobic surface. The top layer 20 comprises a reactive polymer matrix 25, which includes reactive groups, and microstructure-forming particles 23 embedded in the matrix 25. The microstructure-forming particles 23 impose a topographic microstructure to the top layer 20. Side chains 24 are grafted to the reactive matrix 25 by grafted polymerization or grafted copolymerization. These side chains 24 form a nanostructure arranged on top of the microstructure provided for by the microstructure-forming particles 23. The combination of the microstructure and the nanostructure provides for an omniphobic surface of the top layer 20.

It is additionally possible to embed enzymes into at least a portion of the natural substance capsules. Natural substance capsules thereby serve to protect the enzymes from chemical attack, e.g. GOD. In addition, additional aforementioned advantages are also achieved for enzymatic storage.

The natural substance capsules are used as microstructure generators, in particular in the top layer 20 in contact with the medium, since it is classified as harmless by the FDA. The natural substances thereby protect the top layer 20 against aggressive cleaning media, for example strong acids or bases, since they already contain groups that can buffer a pH value. The sensor membrane is thus protected from hydrolytic attack.

The use of natural substance capsules makes it possible to fall back on properties that nature often already prescribes as solutions for the protection of enclosed materials from environmental influences.

For the present application, the natural substance capsules are then mixed in toluene and cooked in a Dean-Stark apparatus with methanol and a few drops of concentrated sulfuric acid and reflux.

Pretreatment of the exine or natural substance capsules can take place, for example, via plasma treatment in an oxygen/ammonium and/or nitrogen/ammonium atmosphere, oxidation via potassium permanganate, or oxidation via ozone or peroxides such as hydrogen peroxides, HOCl, HOBr or the like.

An additional particularly preferred class of microstructured compounds, preferably in capsule form, are polystyrene divinylbenzene compounds and derivatives thereof. Polystyrene compounds can be manufactured via emulsion polymerization or can be commercially purchased.

The aforementioned microstructure generators can then be provided with a nanostructure or surface nanostructure. According to the invention, this takes place by grafting a side chain or a reactive group.

Nanostructuring can be achieved in particular by grafting reactive groups such as vinyl, acrylic, acinyl, and/or methacrylic groups.

Preferred starting materials for grafting are vinyl trimethylsilanes, butadiene-grafted ethoxysilanes, butadiene-grafted methoxysilanes, and/or polyepichlorohydrin in combination with reactive vinyl groups.

Hybrids of organic and inorganic components are also conceivable. For this purpose, microbeads are emulsified and $SiO_2$ nanoparticles with adhesion promoters are added to the emulsion. The particles are then thermally treated in the furnace. This leads to adhesion or bonding of the SiO2-nanoparticles to the microbeads. The surface can also be modified with hydrophobic siloxanes. Hybrid microstructure-forming particles can be formed by any of the following three methods:

(A) tempering polystyrene microbeads and nano-$SiO_2$ at 200-300° C. for 1 h and modifying the surface of the resulting hybrid particles with siloxanes containing perfluorinated side chains;

(B) preparing an emulsion from exine and nano-$SiO_2$ with subsequent tempering in a furnace at 200-300° C. for 1 h and modifying the surface of the resulting hybrid particles with siloxanes containing perfluorinated side chains; or (C) tempering and/or pyrolyzing exine and nano-$SiO_2$ and modifying the surface of the resulting hybrid particles with polybutadiene and/or siloxane.

For grafting of side chains forming a nanostructure to the microstructure-forming particles formed according to the examples (A) and (B), a solution including a radical initiator and 1H,1H,2H perfluoro-1-tetradekene and perfluorooctyl iodide as a chain ender can be added to the microstructure-forming particles. For grafting side chains forming a nanostructure to the particles formed according to example (C), a silane can be added. After a short reaction time of e.g. 10 min up to some hours a solution of isopropanole, sulfuric acid and dimethyldimethoxysilane can be applied to the particles. After waiting for some reaction time, which depends from the temperature (e.g. at 70° C. for 30 seconds, at room temperature for some hours). The grafting can be ended by applying mono chloro-perfluorosiloxane as a chain ender.

Nano-$SiO_2$ is thereby a hybrid variant of a microstructure on which a nanostructured surface is generated.

Within the scope of this invention, all types of grafting that generate a superhydrophobic surface can be used. As a result, the surface of the microstructure-forming particles and the sensor membrane as a whole is repellent to all media such as water, fats, oils, alcohols, and organic acids.

Different grafting methods are preferably used. The different grafting methods include: grafting via esterification of silanes; grafting via radical cross-linking (i.e., thermal or photochemical cross-linking); grafting via anionic or cationic cross-linking; and grafting of long-chain molecules such as PVDF azides with a functional group such as vinyl, vinylene, styrene, and silane group with the polymer interface.

Photochemical cross-linking can preferably also be used in the grafting methods. In photochemical cross-linking, it is thereby preferably also possible to create structures in the surface via masks.

Furthermore, surface nanostructuring of the microstructuring agents embedded in the matrix material can be achieved via radical cross-linking, in particular with the use of at least one vinyltrimethylsilane, a 1H,1H,2H, perfluoro-1-octene, perfluorooctene-1, perfluorooctene-2, 1H, 1H, 2H, 2H,-perfluorooctyl acrylate, a 2-(perfluorooctyl)ethyl-allyl sulfide, a 3-(perfluorooctyl)-2-hydroxypropyl methacrylate, a 2-[2'-(pefluoropropoxy)-1'.1'.2'-trifluoroethoxy]vinylbenzene, a 3-[2'-(pefluoropropoxy)-1'.1'.2'-trifluoroethoxy]vinylbenzene, a 4-[2'-(pefluoropropoxy)-1'.1'.2'-trifluoroethoxy]vinylbenzene, a 2H-perfluoropropyl)-2-propenyl ether, 1,3,5-trichloro-1,1,2-trifluorobutene, and/or a tetrafluoroethylene perfluoroalkyl vinyl ether.

Furthermore, surface nanostructuring of the microstructure-forming particles embedded in the matrix material can be achieved by using a dimethyldimethoxysilane, dimethyldiethoxysilane, trimethylmethoxysilane, hexamethyldisoxane, octamethylcyclotetrasiloxane, polydimethylsiloxane, polydimethylsiloxane, polydimethylsiloxane T22, polydimethylsiloxane T35, polydimethylsiloxane T46, and/or an RF PVDF triethoxysilane.

Within the scope of a reaction for the formation of a surface nanostructuring of the microstructure-forming particles, an RF PVDF 3 azide, an RF PVDF azide, an RF PVDF 2 hydroxy, and/or an RF PVDF 2 bromide can preferably be used as a chain ender.

Variants:

In the following, a concrete example (Variant I) for the manufacturing of a multilayer sensor membrane according to the invention is explained.

First layer: Adhesion promoting layer on substrate. The substrate for the sensor membrane can be a quartz material, for example. A layer of Elastosil E43 is applied to the substrate as a matrix material for this first layer via a known process such as doctoring, laminating, spray-coating, and/or spin-coating.

Second layer: An analyte-sensitive pigment is mixed in E43 and is applied as a second layer onto the first layer.

Third layer: An optically insulating, reflecting layer and/or a diffusion barrier layer is applied onto the second layer.

Fourth layer: A dispersion of hydrophilized exines is sprayed onto the surface by means of spray-coating. After a short reaction time of 10 min to several hours, a solution of isopropanol, sulfuric acid, and dimethyldimethoxysilane is added to the exine on the surface within the scope of a grafting of side chains, and a period of time is left for the reaction. In this instance, the reactivity is strongly dependent on the temperature (70° C. over 30 seconds, for example, then at room temperature for a few hours).

The grafted surface can be end-capped or post-treated with other molecules. Monochloro perfluorosiloxanes, for example, can be attached to the grafted surface for this purpose.

Buffering groups such as carboxylic acid groups can be esterified with methanol, toluene, and/or sulfuric acid in a Dean-Stark apparatus within the scope of the aforementioned manufacturing process.

The invention is based on a sensor membrane that is chemically stable with regard to very hot, corrosive media. It has a self-cleaning effect. A rapid response time, which is between the response times of commercially available silicone sensor membranes and commercially available Teflon membranes, can be achieved.

An additional variant (Variant II) of the manufacturing of a sensor membrane according to the invention is the following grafting of monomers:

First layer: Adhesion promoting layer on substrate. The substrate for the sensor membrane can be a quartz material, for example. A layer of Elastosil E43 is applied onto the substrate as a matrix material for this first layer via a known process such as doctoring, laminating, spray-coating, and/or spin-coating.

Second layer: An analyte-sensitive pigment is mixed in E43 and is applied as a second layer onto the first layer.

Third layer: An optically insulating, reflecting layer and/or a diffusion barrier layer is applied onto the second layer. In the third layer or in an additional intermediate layer applied on top of the third layer, microstructure-forming particles are partially embedded in such a way, that parts of the microstructure-forming particles are protruding from the third layer or the intermediate layer thus forming a nubby structure. The microstructure-forming particles can be e.g. exine or polystyrol-based microbeads.

Fourth layer: A radical initiator is applied onto the surface. After that, a solution with an initiator of [1-(trifluoromethyl)vinyl]benzene and a chain ender is subsequently sprayed on and then thermally cured by increasing the temperature gradually.

An additional variant (Variant III) of the manufacturing of a sensor membrane according to the invention is the following grafting of monomers:

First layer: Adhesion promoting layer on substrate. The substrate for the sensor membrane can be a quartz material, for example. A layer of Elastosil E43 is applied onto the substrate as a matrix material for this first layer via a known process such as doctoring, laminating, spray-coating, and/or spin-coating.

Second layer: An analyte-sensitive pigment is mixed in E43 and is applied as a second layer onto the first layer.

Third layer: An optically insulating, reflecting layer (carbon black-colored E43) and/or a diffusion barrier layer is applied onto the second layer. In the third layer or in an additional intermediate layer applied on top of the third layer, microstructure-forming particles are partially embedded in such a way, that parts of the microstructure-forming particles are protruding from the third layer or the intermediate layer thus forming a nubby structure. The microstructure-forming particles can be e.g. exine or polybutadiene-based microbeads.

Fourth layer: A radical-forming means such as 1H,1H,2H,2H-perfluorodecylvinylether is applied onto the surface. After that, a solution of chloro-dimethyl(3,3,3-trifluoropropyl)silane as a chain ender is subsequently applied, and then cured photochemically (350-400 nm, 2 min).

An additional variant (Variant IV) of the manufacturing of a sensor membrane according to the invention is the following grafting of monomers:

First layer: Adhesion promoting layer on substrate. The substrate for the sensor membrane can be a quartz material, for example. A layer of Elastosil E43 is applied onto the substrate as a matrix material for this first layer via a known process such as doctoring, laminating, spray-coating and/or spin-coating.

Second layer: An analyte-sensitive pigment is mixed in E43 and is applied as a second layer onto the first layer.

Third layer: An optically insulating, reflecting layer and/or a diffusion barrier layer is applied onto the second layer. This layer or an additional layer in a stack above this layer comprises microstructure-forming particles made of polybutadiene particles, which are cross-linked by means of hydrogen peroxide. A radical forming means like 4-Exo-TEMPO is applied onto the surface, and this layer is cured for 72 h at 60° C.

Fourth layer: A solution of perfluorinated polystyrene is subsequently sprayed on and then photochemically cured in an oven at 125° C. for 0.5 h, and is provided with a chain ender and cured again. Alternatively, a TEMPO group can be used as a chain ender.

The contact angle hysteresis (CAH) of Variant IV has been tested with water and ethanol and is less than 5°. The contact angles for omniphobic surfaces are permanently above 150° for the specified solvents. Hysteresis is a measure of the surface quality of the coating. There are always energetic minima and maxima. The correct contact angle is 150° (±<5°).

In an additional embodiment (Variant V) for applying the fourth layer, silicon dioxide is cross-linked in emulsion polymerization with a silane such as p-vinyl(ethyltrimethoxysilane)benzene ((VETMSB) and a monomer from the series of styrene, acrylates, acrylamides, methacrylate, methacrylamide, vinyl ester, and/or vinyl amide. The aforementioned compounds may preferably be grafted with polystyrene (in this instance 4-fluorostyrene). The initiation can take place via additives of an initiator such as AIBN, or by UV/thermally. The microspheres manufactured in this manner are later dispersed in a solution and sprayed onto a sensor layer, in particular the aforementioned third sensor layer of Variants I-IV.

The following compounds are preferably used as the aforementioned monomers of Variant V:

N-tert-butyl-1-diethylphosphono-2,2-dimethylpropyl nitroxide (DEPN), 4-vinyl anisole, 4-acetoxystyrene, 4-tert-butoxystyrene, 3,4-dimethoxystyrene, 2-fluorostyrene, 4-fluorostyrene, 2-(trifluoromethyl)styrene, 3-(trifluoromethyl)styrenes, 4-(trifluoromethyl)styrene, 2,6-difluorostyrene, 2,3,4,5,6-pentafluorostyrene, 3-nitrostyrene, (vinylbenzyl)trimethyl ammonium chloride, α-bromostyrene, 2-bromostyrene, 3-bromostyrene, 4-bromostyrene, 2-chlorostyrene, 3-chlorostyrene, 4-chlorostyrene, 4-chloro-α-methylstyrene, 2,6-dichlorostyrene, 4-vinyl benzylchloride, vinyl benzyl chloride, methyl styrene, in particular α-methyl styrene, 3-methyl styrene, 4-methyl styrene, 1,3-diisopropenylbenzene, 2,4-dim ethyl styrene, 2,5-dimethyl styrene, 2,4,6-trimethyl styrene, perfluorostyrene.

An additional variant (Variant VI) of the manufacturing of a sensor membrane according to the invention is the following grafting of monomers, in particular with vinyl groups:

First layer: Adhesion promoting layer on substrate, for example quartz. A layer of a PVDF siloxane is applied onto the substrate using processes known to the person skilled in the art, such as doctoring, laminating, spray-coating, and/or spin-coating.

Second layer: An analyte-sensitive pigment is mixed in Hyflon AD60 and applied onto the first layer.

Third layer: An optically insulating layer of carbon black in Teflon AF 1600 is applied and, before, during, or after the application, additional natural substance capsules or exines are applied in the third layer.

Fourth layer: A solution of 1H,1H,2H,2H-perfluorodecyl-vinyl-ether is scraped, then treated photochemically (350-400 nm, 2 min)—so that a covalent bond to the exine is created—and the residues are washed off with perfluoromethylcyclohexane.

Furthermore, long-term stable radicals can be provided in the applied material of the fourth layer of Variants I-VI, which radicals react with monomers due to temperature or light activation, but otherwise behave passively.

Within the scope of the present invention, temperature-activatable radicals, what are known as "living radicals," can also be selected from the series of 2,2,6,6-Tetramethylpiperidinyl-1-oxy (TEMPO), 2,2,5-trimethyl-4-phenyl-3-azahexane-3-oxyl (TIPNO), N-tert-butyl-N-[1-diethylphosphono-(2,2-dimethylpropyl)] nitroxide (SG1). They are used to radically graft side chains onto the surface of a sensor membrane layer, especially onto microstructure-forming particles contained thereon. After applying a chain ender, excess components that have not reacted can also be removed from the respective membrane by washing, or they can remain on the surface in the polymer.

In addition to radical grafting, it is likewise preferable that a cationic grafting also takes place.

Of course, the surface structure can be applied not only onto the sensor membrane but also onto the remaining surfaces of a sensor cap, or onto an entire sensor. For this purpose, a coating the sensor with a polybutadiene solution may take place, and the application of a nanostructure (radically, anionically or cationically cross-linkable monomers) and the bonding of the nanostructure to the polybutadiene by means of grafting Alternatively or additionally, a siloxane solution can also be applied onto the sensor caps or sensor surface, and subsequently a nanostructure can be grafted on.

In addition to the hydrolysis stability of the sensor membrane according to the invention, this also exhibits anti-fouling and/or anti-icing behavior.

In summary, the aforementioned compounds or nanostructure-forming particles can be grafted directly onto the molecular chains of one of the aforementioned matrix materials within the scope of the present invention.

In particular, however, in a preferred embodiment of the invention, microstructure-forming particles can initially be embedded in the matrix material, preferably only partially, such that the microstructure-forming particles protrude superficially from the matrix material and can contact the measuring medium. These microstructure-forming particles can preferably be designed as natural substance capsules. An elastomer, thermoplastic elastomers, or thermoplastic preferably lends itself to being a matrix material.

Via grafting, the microstructure-forming particles are provided with nanostructure-forming means, for example with covalently bonded side chains, preferably with polar end groups. The side chains enable the formation of an omniphobic or even super-omniphobic surface, which represents an innovation in the field of sensor membranes.

In addition, the surface can be treated with a plasma, in particular a fluorine plasma, to improve the surface properties.

The invention claimed is:
1. A sensor membrane for an optical sensor, comprising:
an outer layer embodied to contact a liquid medium, wherein the outer layer includes a graft polymer or a graft copolymer forming an omniphobic surface in contact with the liquid medium, and
wherein the outer layer further includes microstructure-forming particles and a nanostructure grafted onto the microstructure-forming particles.

2. The sensor membrane according to claim 1, wherein the microstructure-forming particles are spherical or capsule-shaped components of the outer layer.

3. The sensor membrane according to claim 1, wherein the omniphobic surface has a pin cushion structure or a honeycomb structure.

4. The sensor membrane according to claim 1,
wherein the outer layer includes a reactive matrix material,
wherein the microstructure-forming particles are immobilized in the outer layer and form a microstructure,
wherein the nanostructure is formed as grafted side chains covalently bound to the reactive matrix material located on the microstructure or covalently bound directly on the microstructure, and
wherein the microstructure is selected from a group consisting of silicon oxide particles, titanium oxide particles, polystyrenes, styrene polymers, polybutadiene, natural substance capsules, and hybrids of the aforementioned compounds.

5. The sensor membrane according to claim 4,
wherein the microstructure-forming particles are scaffold structures of diatoms or exines of spores or exines of pollen.

6. The sensor membrane according to claim 4, wherein the microstructure is formed by:
grafting microstructure-forming particles comprising polybutadiene or polybutadiene-coated microstructure-forming particles with ethoxysilane side chains;
grafting microstructure-forming particles comprising polybutadiene or polybutadiene-coated microstructure-forming particles with methoxysilane side chains; or
modifying an exine with hydroxyl groups and double bonds.

7. The sensor membrane according to claim 1, wherein the graft polymer comprises grafted side chains received by grafting one or several of the following components to a matrix material comprising a polymer:
at least one hydrolytically cross-linkable group as a chain extender or as a chain end group and/or as a chain end group, and at least one radical cross-linkable group as a chain extender and/or as a chain end group.

8. The sensor membrane according to claim 7, wherein the at least one hydrolytically cross-linkable group, when it is used as a chain extender, is a mono- or bifunctional silane chosen from the group consisting of: dimethyldimethoxysilane, dimethyldiethoxysilane, trimethylmethoxysilane, hexamethyldisoxane, octamethylcyclotetrasiloxane, polydimethylsiloxane, polydimethylsiloxane, polydimethylsiloxane T22, polydimethylsiloxane T35 and polydimethylsiloxane T46; and when it is used as a chain end group, it is chosen from the group consisting of: trimethyoxysiloxane and triethylethoxysiloxane.

9. The sensor membrane according to claim 7, wherein the at least one radical cross-linkable group, when it is used as a chain extender, is a monofunctional monomer chosen from the group consisting of: perfluorinated groups, perfluoroalkyl groups, alkyl with alkynyl or vinyl groups, styrene, acrylate, acrylamide, methacrylate, methacrylamide, vinyl ester and vinyl amide groups; and when it is used as a chain end group, it is chosen from the group consisting of: 2,2,6,6-tetramethyl-piperidinyl-1-oxy (TEMPO), 2,2,5-trimethyl-4-phenyl-3-azahexane-3-oxyl (TIPNO), N-tert-butyl-N-[1-diethylphosphono-(2,2-dimethylpropyl)] nitroxide (SG1), HALS compounds, thiols, hydrocarbon radicals, and amines.

10. The sensor membrane according claim 1, wherein the microstructure-forming particles are selected from the following group: silicon oxide particles, titanium oxide particles, modified and/or unmodified natural substance capsules, scaffold structures of diatoms, exines of spores and/or exines of pollen, in particular of *Lycopodium clavatum*.

11. The sensor membrane according to claim 1, further comprising:
a further layer including a further matrix material, said further layer being positioned underneath the outer layer,
wherein the sensor membrane has a topographically structured, nubby surface formed by the microstructure-forming particles, a number of which are partly embedded in the further matrix material and protrude from the further matrix material in the form of nubs.

12. The sensor membrane according to claim 1, further comprising:
an adhesion-promoting layer for bonding to a substrate;
a layer sensitive to an analyte, wherein the layer sensitive to an analyte includes luminophore;
at least one of: a reflective layer, a diffusion layer, and an optically insulating layer; and
a top layer including a surface polymer, wherein the top layer has grafted side chains on the surface.

13. The sensor membrane according to claim 1, further comprising:
a plurality of nanostructures grafted onto the microstructure-forming particles,
wherein each nanostructure is formed as a grafted side chain, and
wherein an average distance of a side chain from a directly adjacent side chain is between 2 A (angstroms) and 200 A.

14. The sensor membrane according to claim 13, wherein the grafted side chains have an average length between 10 A and 70 A.

15. The sensor membrane according to claim 1, further comprising:
a hydrolyzable protective layer arranged on the outer layer, where in the protective layer is embodied to dissolve at least partially when exposed to the liquid medium.

16. A sensor cap of an optical sensor, comprising:
a sensor membrane, including
an outer layer embodied to contact a liquid medium, wherein the outer layer includes a graft polymer or a graft copolymer forming an omniphobic surface in contact with the liquid medium and wherein the outer layer further includes microstructure-forming particles and a nanostructure grafted onto the microstructure-forming particles; and
a layer with a graft copolymer beyond the sensor membrane.

17. A method for manufacturing a sensor membrane, comprising:
providing an arrangement of a plurality of functional layers of a sensor membrane, wherein an outer layer in contact with the medium and/or a layer of the sensor membrane adjacent thereto has a surface with microstructure-forming particles embedded in a matrix material of the respective layer; and grafting a compound onto the microstructure-forming particles and/or onto a reactive matrix material covering the microstructure-forming particles by graft polymerization or graft copolymerization, thus forming a nanostructure by forming side chains.

18. The method according to claim 17, wherein parts of the microstructure-forming particles are protruding from the matrix material of the respective layer in the form of nubs.

19. The method of claim 17, wherein the microstructure-forming particles are chosen from a group consisting of: natural substance capsules, inorganic microparticles, and polystyrene particles.

20. The method according to claim 17, further comprising:
grafting side chains onto the reactive matrix material and/or onto the microstructure-forming particles, using temperature-activatable, radicals and/or ions and/or thermal initiators and/or photoinitiators and/or radical-forming means and thereby form nanostructures.

21. The method according to claim 20, further comprising:
modifying photochemically a surface structure of the sensor membrane after grafting by applying a mask at a wavelength between 200 and 1000 nm.

22. The method according to claim 21,
wherein the step of modifying photochemically the surface structure of the sensor membrane includes applying a reactive liquid to the surface structure.

\* \* \* \* \*